May 29, 1956 L. J. PETION 2,747,287
MEASURING INSTRUMENTS
Filed May 9, 1955

INVENTOR.
Louis J. Petion

United States Patent Office 2,747,287
Patented May 29, 1956

2,747,287

MEASURING INSTRUMENTS

Louis J. Petion, Garden City, N. Y.

Application May 9, 1955, Serial No. 506,950

6 Claims. (Cl. 33—141)

This invention relates to new and useful improvements in instruments for measuring distances and the primary object of the present invention is to provide a novel and improved instrument that is particularly designed for measuring straight or curved distances on road maps and drawings of various scales and supply the distance without any further calculation.

An important object of the present invention is to provide a measuring instrument which includes various scales and provides the means by which any of these scales can readily be selected.

Another important object of the present invention is to provide a measuring instrument with a protruding wheel, which when rolled over the surface to be measured rotates a band with an indicator mark on it, said indicator when set at zero on the scale before measuring the distance will move along the scale and indicate the correct distance at the end of the measured distance.

A further object of the present invention is to provide a measuring instrument that is small and compact in structure and which is easy to read.

A still further aim of the present invention is to provide a measuring instrument which is simple and practical in construction, accurate and reliable in use, neat and attractive in appearance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
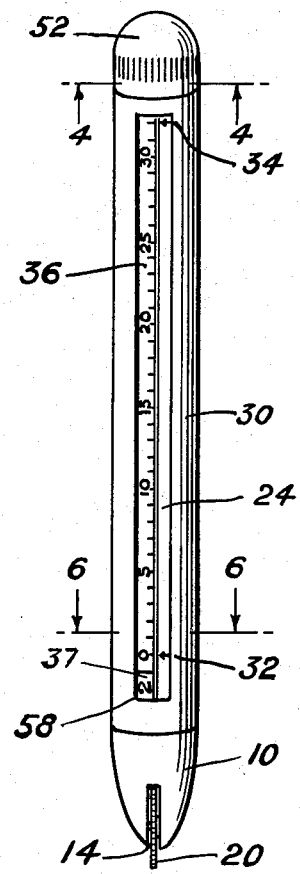
Figure 1 is a perspective view of the present measuring instrument and showing through the window the scale and the indicator band.
Figure 2:
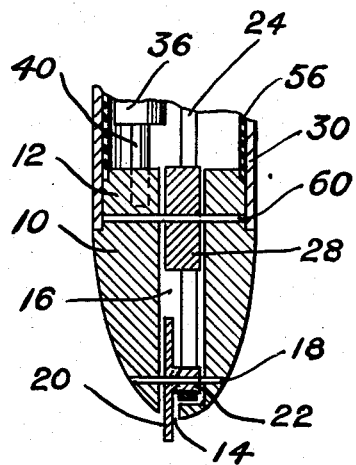
Figure 2 is an enlarged partial cross section taken on the line 2—2 of Figure 6, showing the inside of the wheel housing.
Figure 3:
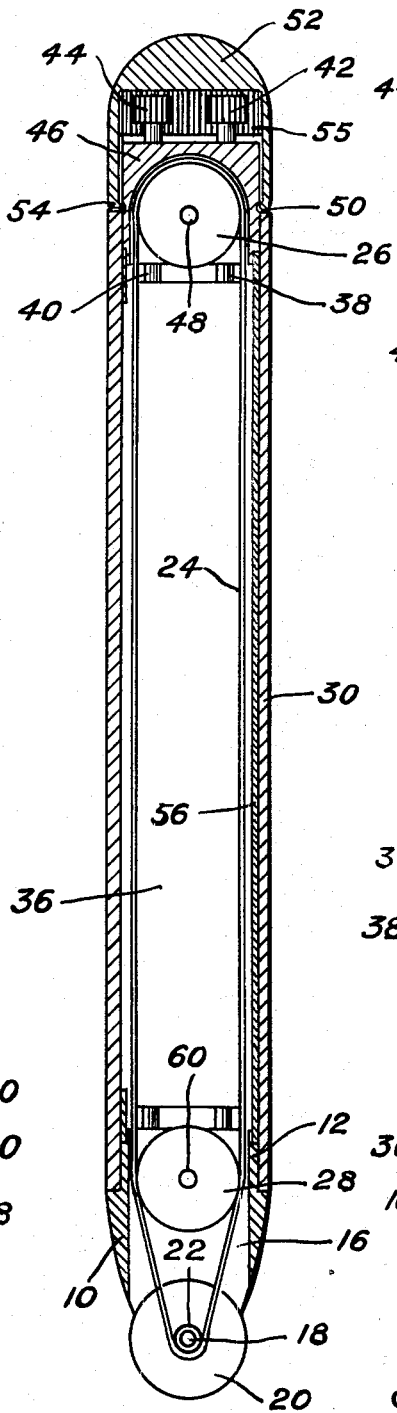
Figure 3 is a longitudinal vertical enlarged sectional view taken substantially through the center of Figure 1.
Figure 4:
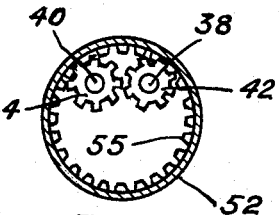
Figure 4 is a cross section through the measuring instrument taken on the line 4—4 of Figure 1 showing the gear construction for selecting the scales.
Figure 5:
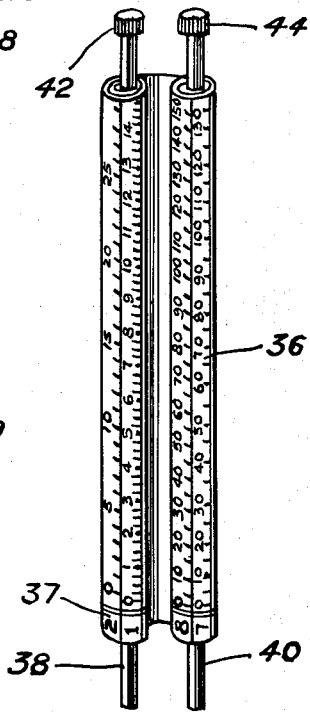
Figure 5 is a separate view of the scales and shafts which are embodied in the barrel. These scales are typical of those used in connection with measuring distances on road maps.
Figure 6:
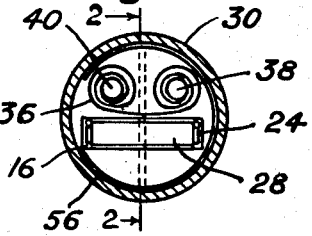
Figure 6 is another cross section through the measuring instrument taken on the line 6—6 of Figure 1.

Referring now to the drawings in detail, wherein for the purpose of illustration there is disclosed a preferred embodiment of the present invention, the numeral 10 represents a substantially frusto-conical wheel housing having a reduced annular extension 12 at its major end. The housing 10 is provided with a slot 14 in its lower end that terminates in an enlarged slot 16. A shaft 18 supports a wheel 20 which is used to roll over the surface to be measured. Wheel 20 has a hub 22 of a smaller diameter.

A band 24 preferably of rubber is mounted on hub 22 at one end and on wheel 26 at the other end. Another wheel 28 which is supported by shaft 60 spreads the band into a position close to and parallel with the barrel 30 which is made of a transparent material. Band 24 has a line or an indicator 32 marked on its outer surface and another line or indicator 34 preferably of a different color at scale length from line 32.

The numeral 36 indicates a roll of paper or other flexible material on which a number of scales are printed. The figure in box 37 identifies the scale. If the scale is intended for measuring distances on road maps the figure in box 37 would indicate the number of miles per inch on the road map. One end of roll 36 is attached to shaft 38 and the other end is attached to shaft 40. A gear 42 is mounted at the extreme end of shaft 38 and a gear 44 is mounted at the extreme end of shaft 40.

Numeral 46 indicates a bracket on which wheel 26 is mounted by means of a shaft 48. Bracket 46 is provided with a groove 50 for the purpose of securing cap 52 to it by peening its edge 54 into the groove. However the cap 52 is to have enough freedom so it can be rotated.

In the interior of cap 52 is a ring gear 55 which meshes with gears 42 and 44.

A non-transparent mask 56 is inserted into the transparent barrel 30 and is shaped to provide a window 58 through which band 24 and one of the scales on roll 36 are visible.

In practical use of the present invention, by turning wheel 20 until indicator 34 appears on the zero line of the scale and then turning cap 52 and selecting the desired scale, the instrument is now ready for measurement and wheel 20 is rolled over the surface to be measured. If the distance to be measured exceeds the highest figure on the scale, the second indicator 32 will appear and in this case the highest figure on the scale is added to the figure at which the indicator 32 stops.

In view of the foregoing description taken in conjunction with the accompanying drawings it is believed that a clear understanding of the device will be quite apparent to those skilled in the art. A more detailed description is accordingly deemed unnecessary.

It is to be understood however, that even though there is herein shown and described a preferred embodiment of the invention the same is susceptible to certain changes fully comprehended by the spirit of the invention as herein described and the scope of the appended claims.

Having described the invention, what is claimed as new is:

1. In a measuring instrument including a wheel housing having a slot, said slot having an enlarged inner portion, a wheel protruding through this slot, a hub on this wheel located inside the housing, another wheel inside the enlarged portion, a barrel carried by the housing, a bracket at the other end of the barrel, said bracket holding another wheel, a circular band mounted over the circumferences of the wheel hub of the protruding wheel and the other two wheels, and a roll of paper or other flexible material imprinted with scales and each end of this roll mounted and rolled onto a shaft, both shafts seated with one end in the wheel housing and the other end protruding through the wheel bracket.

2. The combination of claim 1 wherein said means include a gear at the protruding end of each scale shaft, and a cap with an internal ring gear, said gear meshing with the two gears on the scale shafts.

3. In a measuring instrument including a wheel housing having a slot, said slot having an enlarged inner portion, a wheel protruding through this slot, a hub on this wheel located inside the housing, another wheel inside the enlarged portion, a barrel carried by the housing, a bracket at the other end of the barrel, said bracket holding another wheel, a circular band mounted over the circumferences of the hub of the protruding wheel and the other two wheels, said band having two indicators marked on the outer surface, these indicators being spaced the same distance as that from the zero on the scale to the highest figure on the scale, a roll of paper or other flexible material imprinted with scales and each end of this roll mounted and rolled onto a shaft, both shafts seated with one end in the wheel housing and the other end protruding through the wheel bracket, each of said shafts having a gear at the protruding end, and a cap with an internal ring gear which meshes with the two gears on the scale shafts.

4. A measuring instrument comprising a wheel housing having a slot, said slot having an enlarged inner portion, a wheel with a hub of a smaller diameter, the wheel protruding through the slot, the hub seated in the enlarged portion of the housing, the ratio between the wheel diameter and the hub diameter being equal to the ratio between the length of the scale and the length of the measured distance, another wheel inside the enlarged portion, a barrel carried by the housing, a bracket at the other end of the barrel, said bracket holding another wheel, a circular band mounted over the circumferences of the wheel hub and the other two wheels, and a roll of paper or other flexible material imprinted with scales and each end of this roll mounted and rolled onto a shaft, both shafts seated with one end in the wheel housing and the other end protruding through the wheel bracket.

5. A measuring instrument comprising a wheel housing having a slot, said slot having an enlarged inner portion, a wheel protruding through this slot, a hub on this wheel located inside the housing, another wheel inside the enlarged portion, a barrel carried by the housing, a bracket at the other end of the barrel, said bracket supporting a wheel, a circular band mounted over the circumferences of the wheel hub and the other two wheels, a roll of paper or other flexible material imprinted with scales of the same ratio to the distance to be measured as the ratio between the protruding wheel and its hub, and two shafts on which the scales are rolled.

6. A measuring instrument comprising a wheel housing having a slot, said slot having an enlarged inner portion, a wheel with a hub supported by a shaft in the inner portion of the housing, the wheel protruding through the slot, another wheel supported by a shaft on the inside of the housing, a barrel made of a transparent material supported by the housing, a non-transparent insert against the inside wall of the barrel, shaped to leave a portion of the barrel uncovered for visibility of one of the scales and the indicator band, a bracket supporting a wheel at the other end of the barrel, a circular band mounted over the circumferences of the wheel hub and the two wheels, said band having two indicators marked on the outer surface, a roll with printed scales mounted and rolled onto two shafts with one end of the shafts seated in the wheel housing and the other end protruding through the bracket, each of the shafts having a gear at the protruding end, and a cap with an internal ring gear which meshes with the two gears on the shafts.

References Cited in the file of this patent

UNITED STATES PATENTS

| 2,000,625 | Vaughan | May 7, 1935 |

FOREIGN PATENTS

| 14,457 | Great Britain | Nov. 9, 1886 |
| 428,992 | Great Britain | May 22, 1935 |
| 957,858 | France | Aug. 29, 1949 |